US012529898B2

(12) United States Patent
Michalsen et al.

(10) Patent No.: US 12,529,898 B2
(45) Date of Patent: Jan. 20, 2026

(54) WAVEGUIDE FOR AN AUGMENTED REALITY OR VIRTUAL REALITY DISPLAY

(71) Applicant: Snap Inc., Santa Monica, CA (US)

(72) Inventors: Tom Vidar Michalsen, Reading (GB); Mohmed Salim Valera, Sutton Coldfield (GB)

(73) Assignee: Snap Inc., Santa Monica, CA (US)

( * ) Notice: Subject to any disclaimer, the term of this patent is extended or adjusted under 35 U.S.C. 154(b) by 586 days.

(21) Appl. No.: 17/995,372

(22) PCT Filed: Mar. 22, 2021

(86) PCT No.: PCT/EP2021/057311
§ 371 (c)(1),
(2) Date: Oct. 3, 2022

(87) PCT Pub. No.: WO2021/197907
PCT Pub. Date: Oct. 7, 2021

(65) Prior Publication Data
US 2023/0161162 A1    May 25, 2023

(30) Foreign Application Priority Data

Apr. 3, 2020  (EP) .................................... 20168055

(51) Int. Cl.
*G02B 27/01*  (2006.01)
*G02B 27/09*  (2006.01)

(52) U.S. Cl.
CPC ..... *G02B 27/0172* (2013.01); *G02B 27/0944* (2013.01)

(58) Field of Classification Search
CPC .................................................. G02B 27/0172
See application file for complete search history.

(56) References Cited

U.S. PATENT DOCUMENTS 10,935,730 B1    3/2021  Lou et al.
2002/0060845 A1  5/2002  Suzuki et al.
(Continued)

FOREIGN PATENT DOCUMENTS

CN    106575034 A    4/2017
CN    106646885 A    5/2017
(Continued)

OTHER PUBLICATIONS

"Chinese Application Serial No. 202180026123.0, Office Action mailed Aug. 6, 2024", w/ English Translation, 22 pgs.
(Continued)

*Primary Examiner* — Edmond C Lau
(74) *Attorney, Agent, or Firm* — Schwegman Lundberg & Woessner, P.A.

(57) ABSTRACT

A waveguide (1) for use in an augmented reality or virtual reality display, comprising: an output diffractive element comprising a plurality of optical structures (22, 28, 26) in a photonic crystal; a first major surface of the waveguide, and a second major surface of the waveguide, the first major surface separated in a direction perpendicular to a plane of the waveguide from the second major surface, wherein light propagates along the waveguide towards the output diffractive element by undergoing total internal reflection between the first and second major surfaces wherein the plurality of optical structures (22, 28, 26) are arranged in a plane of the waveguide in an array which is configured to receive light from an input direction and diffract the light into a plurality of orders, some of the orders being diffracted in the plane of the waveguide at an angle to the input direction to provide 2D expansion across the plane of the waveguide, and other orders being out-coupled in a direction perpendicular to the plane of the waveguide towards a viewer; wherein at least one of the optical structures (22, 28, 26) of the plurality of (Continued)

optical structures (22, 28, 26) has a profile in a direction that is perpendicular to the plane of the waveguide, wherein the profile varies along one or more directions parallel to the plane of the waveguide, such that the out-coupled orders are provided preferentially from the first major surface of the waveguide compared to the second major surface of the waveguide.

20 Claims, 5 Drawing Sheets

(56) References Cited

U.S. PATENT DOCUMENTS

| | | | |
|---|---|---|---|
| 2005/0074579 A1 | 4/2005 | Suzuki et al. | |
| 2007/0280592 A1 | 12/2007 | Furuya et al. | |
| 2010/0214659 A1* | 8/2010 | Levola | G02B 6/0035 359/566 |
| 2013/0100362 A1 | 4/2013 | Saeedi et al. | |
| 2017/0102543 A1* | 4/2017 | Vallius | G06T 19/006 |
| 2017/0336552 A1 | 11/2017 | Masuda et al. | |
| 2018/0113313 A1 | 4/2018 | Tekolste et al. | |
| 2018/0217305 A1 | 8/2018 | Valera | |
| 2018/0292654 A1 | 10/2018 | Wall et al. | |
| 2019/0121126 A1 | 4/2019 | Simmonds | |
| 2020/0088932 A1 | 3/2020 | Schultz et al. | |
| 2020/0379260 A1 | 12/2020 | Blomstedt | |
| 2020/0393609 A1 | 12/2020 | Blomstedt | |
| 2021/0063627 A1 | 3/2021 | Park et al. | |
| 2022/0197036 A1 | 6/2022 | Valera et al. | |

FOREIGN PATENT DOCUMENTS

| | | |
|---|---|---|
| CN | 106662754 A | 5/2017 |
| CN | 107735716 A | 2/2018 |
| CN | 108345062 A | 7/2018 |
| CN | 108474901 A | 8/2018 |
| CN | 109445096 A | 3/2019 |
| CN | 110412684 A | 11/2019 |
| CN | 111194422 A | 5/2020 |
| CN | 115362405 | 3/2025 |
| CN | 119986891 | 5/2025 |
| EP | 4127814 A1 | 2/2023 |
| JP | 2002014213 A | 1/2002 |
| JP | 6308629 B2 | 3/2018 |
| TW | 201928447 A | 7/2019 |
| WO | 2016020643 | 2/2016 |
| WO | WO-2018178626 A1 | 10/2018 |
| WO | 2020009788 | 1/2020 |
| WO | WO-2021197907 A1 | 10/2021 |

OTHER PUBLICATIONS

"Chinese Application Serial No. 202180026123.0, Response filed Nov. 22, 2024 to Office Action mailed Aug. 6, 2024", w/ current English claims, 12 pgs.

"European Application Serial No. 21153229.6, Invitation to Remedy Deficiencies in a Request Under Rule 22 EPC mailed Sep. 9, 2022", 2 pgs.

"European Application Serial No. 21153229.6, Response filed Nov. 8, 2022 to Invitation to Remedy Deficiencies in a Request Under Rule 22 EPC mailed Sep. 9, 2022", 14 pgs.

"European Application Serial No. 21712860.2, Communication pursuant to Rules 161(1) and 162 EPC", 3 pgs.

"European Application Serial No. 21712860.2, Indication of deficiencies in a request under Rule 22 EPC mailed Aug. 10, 2022", 2 pgs.

"European Application Serial No. 21712860.2, Response filed Sep. 2, 2022 to Indication of deficiencies in a request under Rule 22 EPC mailed Aug. 10, 2022", 8 pgs.

"European Application Serial No. 21712860.2, Response to Communication pursuant to Rules 161(1) and 162 EPC filed Nov. 24, 2022", 14 pgs.

"International Application Serial No. PCT/EP2021/057311, International Preliminary Report on Patentability mailed Oct. 13, 2022", 13 pgs.

"International Application Serial No. PCT/EP2021/057311, International Search Report mailed Jun. 22, 2021", 4 pgs.

"International Application Serial No. PCT/EP2021/057311, Written Opinion mailed Jun. 22, 2021", 11 pgs.

"Taiwanese Application Serial No. 110112254, Office Action mailed Jan. 6, 2025", W/English Translation, 13 pgs.

Yin, Hairong, et al., "Full-mode analysis of a two-dimensional photonic crystal waveguide", Acta Physica Sinica, 56(3), doi: 10.7498/aps.56.1590, (Mar. 12, 2007), 1590-1597.

"Taiwanese Application Serial No. 110112254, Response filed Apr. 7, 2025 to Office Action mailed Jan. 6, 2025", w/ English claims, 58 pgs.

"Korean Application Serial No. 10-2022-7038469, Notice of Preliminary Rejection mailed Jul. 2, 2025", w/ English Translation, 17 pgs.

"Taiwanese Application Serial No. 110112254, Office Action mailed Aug. 20, 2025", w/ English Translation, 10 pgs.

"Korean Application Serial No. 10-2022-7038469, Response filed Aug. 26, 2025 to Notice of Preliminary Rejection mailed Jul. 2, 2025", w/ English claims, 34 pgs.

* cited by examiner

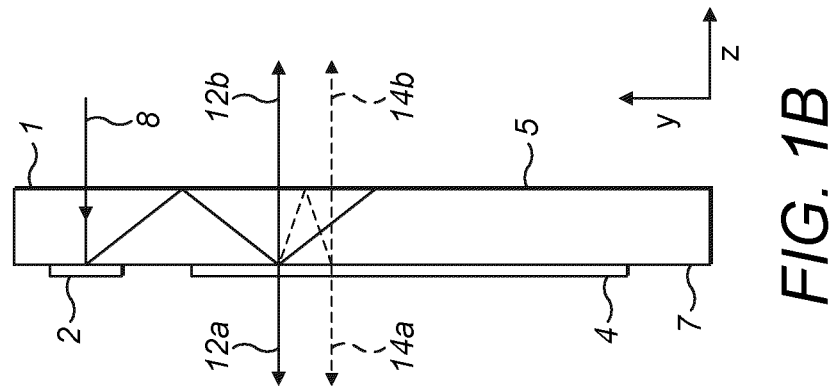
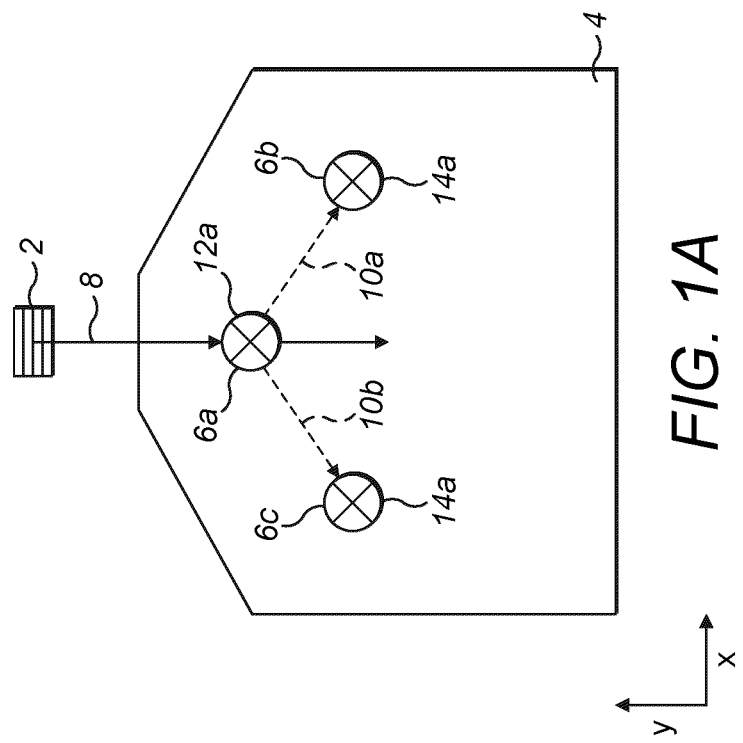

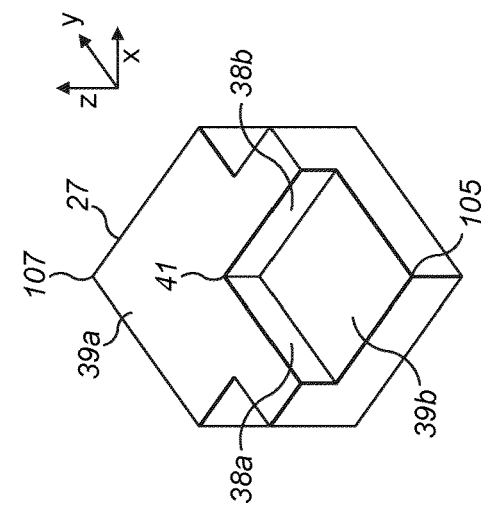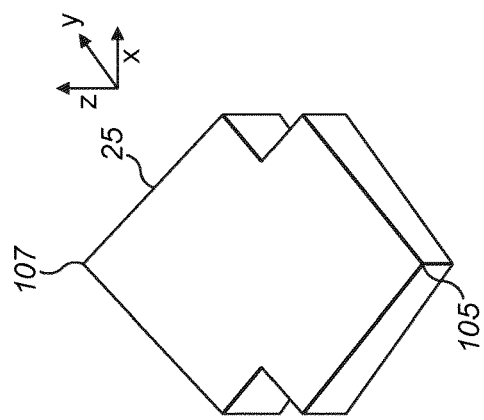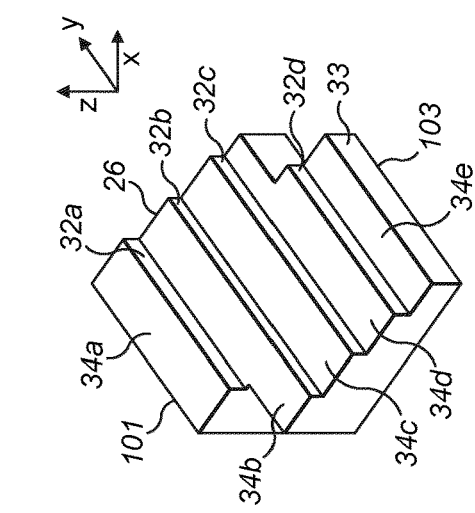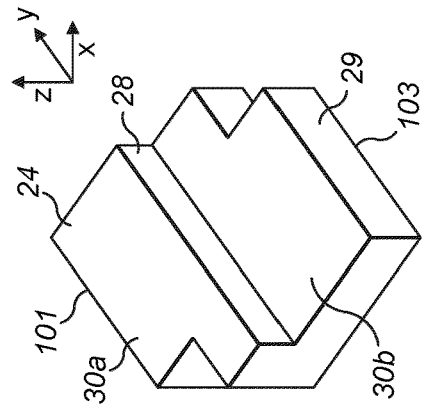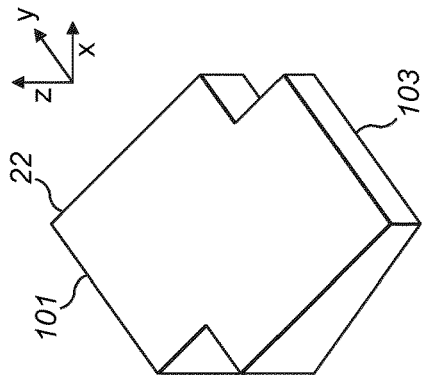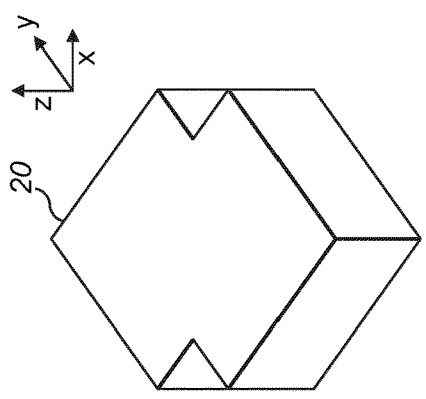

WAVEGUIDE FOR AN AUGMENTED REALITY OR VIRTUAL REALITY DISPLAY

This application is a U.S. national-phase application filed under 35 U.S.C. § 371 from International Application Serial No. PCT/EP2021/057311, filed Mar. 22, 2021, and published as WO 2021/197907 on Oct. 7, 2021, which claims the benefit of priority to EP Application Serial No. 20168055.0, filed on Apr. 3, 2020, each of which are incorporated herein by reference in their entireties.

TECHNICAL FIELD

The present invention relates to a waveguide for use in an augmented reality or virtual reality display. In particular, the invention relates to a waveguide in which input light is expanded in two orthogonal directions in an output element and is coupled out of a waveguide towards a viewer in a preferential direction. This can allow physical expansion of the eyebox in an augmented reality display whilst ensuring improved efficiency of the system.

BACKGROUND

An augmented reality display allows a user to view their surroundings as well as projected images. In military or transportation applications the projected images can be overlaid on the real world perceived by the user. Other applications for these displays include video games and wearable devices, such as glasses.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having a refractive index change relative to the surrounding waveguide medium. The pillars in WO 2016/020643 are described as having a circular cross-sectional shape when viewed in the plane of the waveguide, from the perspective of a viewer. This arrangement has been found to be very effective at simultaneously expanding light in two dimensions and coupling light out of the waveguide. Advantageously this can improve the use of space on the waveguide which can decrease the cost of manufacture.

An optical device having pillars which have a diamond cross-sectional shape is disclosed in WO2018/178626. A modified diamond cross-sectional shape is also shown, the modified diamond having notches. Pillars having these shapes, rather than circular cross section, have been shown to reduce the occurrence of a central strip in the output element having a higher relative brightness than other parts, reducing the undesirable "striping" effect somewhat in the output image. Other shapes have also been proposed.

One drawback of these types of waveguides is that when the light is incident on the output element diffraction orders which couple light out of the waveguide may extend in opposite directions. This may include orders that are transmitted through the grating and out to the viewer, and orders that are reflected by the grating and out to the viewer. Typically waveguide systems are designed such that the viewer views only a single one of these out-coupled orders. This leads to a decrease in efficiency of the waveguide as a portion of the light that could be used to form an image for the viewer is wasted in this unwanted outcoupling direction. In addition, the unwanted coupling order also forms an image which could cause privacy concerns by allowing external observers to see what the wearer is viewing.

SUMMARY OF INVENTION

According to an aspect of the invention there is provided a waveguide for use in an augmented reality or virtual reality display, comprising: an output diffractive element comprising a plurality of optical structures in a photonic crystal; wherein the plurality of optical structures are arranged in a plane of the waveguide in an array which is configured to receive light from an input direction and diffract the light into a plurality of orders, some of the orders being diffracted in the plane of the waveguide at an angle to the input direction to provide 2D expansion across the plane of the waveguide, and other orders being out-coupled towards a viewer; wherein at least one of the optical structures of the plurality of optical structures has a profile in a direction that is perpendicular to the plane of the waveguide, wherein the profile varies along one or more directions parallel to the plane of the waveguide, such that the out-coupled orders are provided preferentially from one major surface of the waveguide.

Preferably, the orders being out-coupled are in a direction perpendicular to the plane of the waveguide towards a viewer.

Preferably, the waveguide comprises a first major surface of the waveguide, and a second major surface of the waveguide, the first major surface separated in a direction perpendicular to the plane of the waveguide from the second major surface, wherein light propagates along the waveguide towards the output diffractive element by undergoing total internal reflection between the first and second major surfaces.

Preferably, the out-coupled orders are provided from the first major surface of the waveguide compared to the second major surface of the waveguide. This may be preferentially from the first major surface of the waveguide compared to the second major surface of the waveguide.

In this way each of the optical structures may have a height that varies in, i.e. across, the plane of the waveguide. Thus, the optical structures can have a blazed structure. Advantageously this blazed structure can preferentially diffract light towards the viewer from one major surface, i.e. side, of the waveguide. In this way, either the transmission or reflected orders can be eliminated, or significantly suppressed. With the light outcoupled out of the waveguide only in a single direction, either in the transmission or reflected order, the optical efficiency of the output diffractive optical element can be increased. This can advantageously improve battery conservation in a wearable device, or it can reduce the power demands of a projector. The plane of the waveguide may be in the x-y plane. In this notation the height of the optical structure would be along the z-axis. The major surfaces may be opposite sides of the waveguide.

The 2D expansion across the plane of the waveguide results in 2D pupil replication. Thus, the orders that are not out-coupled are diffracted at an angle to the input direction to provide a plurality of diffraction orders. The angle to the input direction may be ±60°. Alternatively, it may be ±45°. Alternatively, it may be any other angle that is different to the input direction.

In some arrangements, the profile of the at least one of the optical structures of the plurality of optical structures may vary continuously along the one or more directions parallel to the plane of the waveguide. In this way, the profile of the optical structures may have a gradient that changes continuously over the optical structure. A continuous slope may provide improved control of the efficiency and directionality of the diffracted orders.

Alternatively, the at least one of the plurality of optical structures has a discontinuity in its profile. In other arrangements the at least one of the plurality of optical structures comprises a plurality of discontinuities. In this way, the variation in profile may be achieved by having one or more steps in the optical structure. Each step may have a substantially flat portion that is parallel with the plane of the waveguide, separated by vertical sections that are perpendicular to the plane of the waveguide. This may aid in the manufacture of the optical structures, whilst also providing the desired effect of increasing the efficiency of the reflected output orders relative to the transmitted output orders, or vice-versa.

Preferably, the variation in profile of at least some of the plurality of optical structures may be different to the variation in profile of others of the plurality of optical structures. Not all of the optical structures may have a profile that varies in the same way. By having differences in the variation in profile between optical structures the optical structures may possess varying scattering characteristics. In some arrangements the variation of the profile of optical structures varies across the output diffractive element. Thus, the optical structures at different regions of the output diffractive element may have different variations in profiles (i.e. to each other). The variation in profile may be represented as a measure of the variation in profile the measure defining the extent through which the variation in profile can be measured.

In this way, the variation in profile of the optical structures may vary across the output diffractive element to achieve desired scattering at specific regions of the output diffractive element. For instance in a first region of the output diffractive element the optical structures may all have similar variations in profiles, whereas at a different second region of the output diffractive element the variation in profile of the optical structures may be different to that in the first region. Alternatively, the different variations in profiles of the optical elements may be randomly distributed across the output diffractive element.

The input direction may define a first axis in the plane of the waveguide, and the one or more directions through which the optical structures vary in profile may be at an angle to the input direction. This angle may be at ±60°. Typically a proportion of the input light may be diffracted by the optical structures at an angle of ±60°. This arrangement ensures that, after an initial turn, when the light is incident on a subsequent optical structure the slope of the height of the optical structure is in substantially the same direction to which the light is incident on that optical structure. Alternatively, the angle may be at ±45°, or any other angle. For instance, using the notation given above the input direction may be along the y-axis.

The direction through which the optical structures on a first side of the first axis vary in profile may be at a first angle to the input direction and the direction through which optical structures on a second side of the first axis vary in profile may be at a second angle to the input direction. The first side of the first axis and the second side of the first axis are in the plane of the waveguide separated by a line formed along the input direction extending from the point at which light is incident at the output diffractive element. In this way, after an initial turn, when the light is incident on a subsequent optical structure the slope of the profile of the optical structure is in the same direction to which the light is incident on that optical structure. In one arrangement the first angle may be +60° and the second angle may be −60°. In another arrangement, the first angle may be +45° and the second angle may be −45°. In other arrangements the angles may be any other angle.

In some arrangements the optical structures on the first axis vary in profile in the input direction. Thus, the optical structure which provides the initial diffraction of the light from the input grating may have a profile that varies along an axis defined by the input direction. This ensures that upon the initial diffraction of the input light with the output grating the light is preferentially diffracted in the single intended direction, i.e. either in transmitted or reflected orders.

In some arrangements, at least one of the plurality of optical structures is arranged such that the profile of the at least one optical structure has a negative gradient in a direction away from a point at which the light is incident on the at least one optical structure. This causes reflected diffraction orders to be preferentially selected and transmission diffraction orders to be preferentially suppressed. In some arrangements all of the plurality of optical structures may be arranged in such a way. In other words, the profile at the side of the optical structure at which the light is incident is higher, or has a greater physical extent, than the profile at the side of the optical structure furthest from the side at which the light is incident. The physical extent being in the z-axis. This means that the profile slopes downwards from the side of the optical structure at which the light is incident. This slope may be continual or stepped. In this way, the optical structure extends higher in the z-axis at the section at which the light is incident than it does compared to the section of the optical structure furthest from the side at which the light is incident.

Alternatively, or in addition, at least one of the plurality of optical structures is arranged such that the profile of the at least one optical structure has a positive gradient in a direction away from a point at which the light is incident on the at least one optical structure. This causes transmission diffraction orders to be preferentially selected and reflected diffraction orders preferentially suppressed. In some arrangements, all of the plurality of optical structures may be arranged in such a way. In other words, the profile at the side of the optical structure at which the light is incident is lower, or has a smaller physical extent, than the profile at the side of the optical structure furthest from the side at which the light is incident. This means that the profile slopes upwards from the side of the optical structure at which the light is incident. This slope may be continual or stepped. In this way, the optical structure extends higher in the z-axis at the section furthest to which the light is incident than it does compared to the section of the optical structure at which the light is incident.

Preferably, the waveguide may comprise an input diffractive optical element, separate from the diffractive output optical element, configured to couple light into the waveguide and to provide light to the plurality of optical structures in the array in the input direction.

The plurality of optical structures, respectively, may have a shape, when viewed in the plane of the waveguide, comprising a plurality of substantially straight sides having respective normal vectors at different angles. In other words, the cross section of the optical structure when viewed in the x-y plane may be a shape having a plurality of substantially straight sides having respective normal vectors at different angles. For instance, it may be a notched diamond shape as described in WO2018/178626. Alternatively, it may have a different cross sectional shape, such as circular or rectangular.

The array of optical structures in the waveguide may be referred to as a photonic crystal. The waveguide may be provided within an optical display.

The optical structures preferably exhibit differences in refractive index from a surrounding medium. In this way, the optical structures can be embedded within a waveguide and their diffractive properties can be created due to a difference in refractive index between the structures and the waveguide medium.

The optical structures may be provided as surface relief features on a surface of the waveguide. The mismatch between the refractive index of the surface relief features and the air that surrounds them may provide the desired diffractive properties. In some embodiments a coating may be provided on the optical structures in order to control diffraction efficiency.

Preferably, the waveguide is a planar slab waveguide. Propagation of the light through the waveguide is via total internal reflection as the light is incident and reflected from the first major surface of the waveguide in the plane of the waveguide and the second major surface of the waveguide in the plane of the waveguide. In this way, as the light is reflected off each face, it propagates along the waveguide from the input diffractive element towards the output diffractive element.

According to a further aspect there is provided an augmented reality or virtual reality display, comprising the waveguide of the above aspect.

According to a further aspect there is provided a method manufacture of a waveguide for an augmented reality or virtual reality display, comprising the steps of: providing an output diffractive element comprising a plurality of optical structures in a photonic crystal; arranging the plurality of optical structures, wherein the plurality of optical structures are arranged in a plane of the waveguide in an array which is configured to receive light from an input direction and diffract the light into a plurality of orders, some of the orders being diffracted in the plane of the waveguide at an angle to the input direction to provide 2D expansion across the plane of the waveguide, and other orders being out-coupled towards a viewer, and wherein at least one of the optical structures of the plurality of optical structures has a profile in a direction that is perpendicular to the plane of the waveguide, wherein the profile varies along one or more directions parallel to the plane of the waveguide, such that the out-coupled orders are provided preferentially from one major surface of the waveguide.

Preferably, the orders being out-coupled are in a direction perpendicular to the plane of the waveguide towards a viewer.

Preferably, the waveguide comprises a first major surface of the waveguide, and a second major surface of the waveguide, the first major surface separated in a direction perpendicular to a plane of the waveguide from the second major surface, wherein light propagates along the waveguide towards the output diffractive element by undergoing total internal reflection between the first and second major surfaces.

Preferably, the out-coupled orders are provided from the first major surface of the waveguide compared to the second major surface of the waveguide. This may be preferentially from the first major surface of the waveguide compared to the second major surface of the waveguide.

DESCRIPTION OF FIGURES

Embodiments of the invention are now described, by way of example, with reference to the drawings, in which:

FIGS. 1A and 1B show a top view and edge view of a known waveguide;

FIG. 3A-F show numerous different arrangements of optical structures for use in a diffractive output element according to the present invention;

DETAILED DESCRIPTION

Figure 2B:
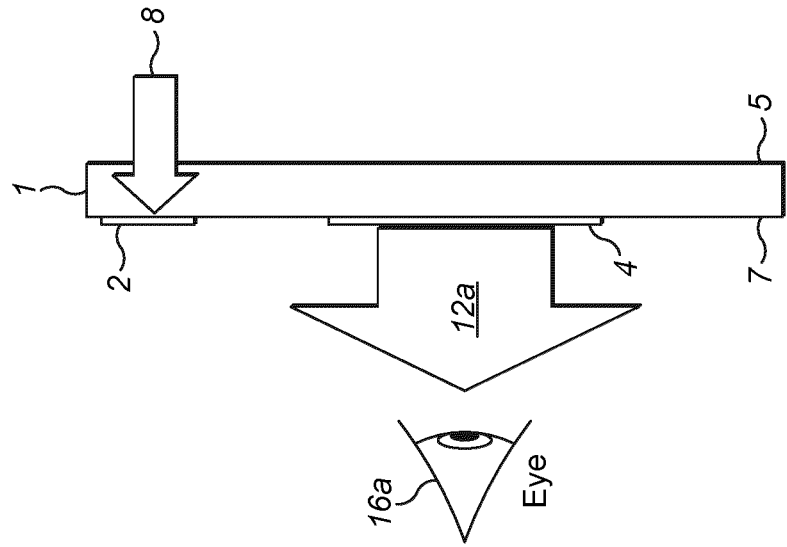
FIG. 2B shows a waveguide where the output viewing position is from the same major surface of the waveguide on which the output grating is located.

FIG. 1A shows a top view, and FIG. 1B shows edge view, of waveguide 1 as disclosed in WO 2016/020643.

An input diffraction grating 2 is provided on a surface of the waveguide 1 for coupling light from a projector (not shown) into the waveguide 1. Light that is coupled into the waveguide travels by total internal reflection towards an output element 4 which includes a photonic crystal. In this example the photonic crystal includes pillars. The pillars have a different refractive index relative to the refractive index of the surrounding waveguide medium and they are arranged in an array having hexagonal symmetry. The pillars may be referred to as nanostructures, diffractive optical structures, or optical structures.

As can be seen from FIG. 1A the light from the input grating 2 is coupled towards the output grating 4 along input light path 8. As can be seen from FIG. 1B the light propagates by total internal reflection between a first major surface 5 and second major surface 7 of the waveguide 1. Position 6a shows the point at which the input light first interacts with the grating formed by the array of optical structures. Light is then diffracted at position 6a into a number of diffraction orders.

A portion of the light is diffracted by ±60° into turn-orders shown by paths 10a and path 10b.

A further portion of the light is diffracted out of the waveguide into what is referred to as output orders. These can be seen in FIG. 1B as reflected order 12b and transmitted order 12a. The reflected order 12a out of the plane is shown in FIG. 1A, although both orders are present as shown in FIG. 1B. The reflected order 12b is where the light has passed back through the waveguide 1 after diffraction with the output grating 4 and then subsequently out of the waveguide. The transmitted order 12a is where the light passes out of the output grating 4 and out of the waveguide 1 on the same side of the waveguide 1 that the output grating 4 is positioned. Thus, the reflected 12b and transmitted 12b orders are in opposite directions to each other, extending from different respective major surfaces of the waveguide 1. The reflected order 12b passes out of the first major surface 5 of the waveguide 1. The transmitted order 12a passes out of the second major surface 7 of the waveguide 1.

After diffraction at position 6a light in each of the turn orders 10a 10b then are diffracted at positions 6b 6c by the array of optical structures at these positions generating further turn orders and further output orders. The further output orders are shown in FIG. 1B as reflected order 14b and transmitted order 14a.

It can be understood that both the reflected orders and the transmitted orders are capable of forming an image. However, in conventional waveguide systems typical designs dictate that only the reflected or the transmitted orders are actually utilised by a viewer. This can be seen in FIGS. 2A and 2B.

Figure 2A:
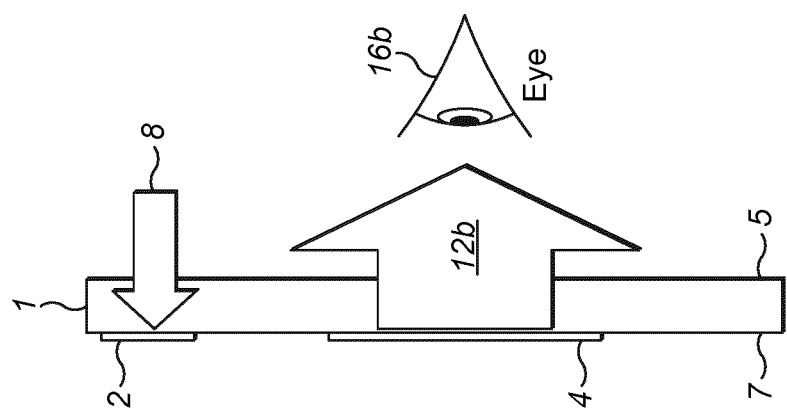
FIG. 2A shows a waveguide where the output viewing position is from the major surface of the waveguide opposite to which the output grating is located.

FIG. 2A shows a waveguide 1 where the viewer's viewing position 16b is from the major surface 5 of the waveguide 1 opposite to the major surface on which the output grating 4 is located. In this arrangement reflected order 12b is providing the image to the viewing position 16b.

FIG. 2B shows an alternative type of waveguide 1 where the viewer's viewing position 16a is from the major surface 7 of the waveguide 1 on which the output grating 4 is located. In this arrangement the transmitted order 12a is providing the image to the viewing position 16a.

In conventional systems, such as those disclosed in the prior art cited above, even though only one of the transmitted or reflected orders are used to generate the image the other order is still present. This means that an image forming order is present in the direction away from the eye. This means that this light is lost which reduces the efficiency of the system. This also can cause privacy issues as third parties facing the user may be able to view the information which the user is viewing.

The present invention is directed at preventing these issues of unwanted transmission or reflection orders, such that only transmission or reflected orders are produced.

FIG. 3A-F show numerous different arrangements of optical structures for use in a diffractive output element. FIG. 3A shows optical structure 20 which has a notched diamond shape as described in WO2018/178626. As can be seen the optical structure 20 has a flat uniform profile. An optical structure with such a profile results in both the transmission and reflection orders being present, as shown in FIG. 1B.

It has been found that through modifying the profile of the optical structure 20, shown in FIG. 3A, one of the transmitted or reflected output orders can be suppressed. Specifically, this can be achieved through having a profile that varies across the optical structure.

FIG. 3B shows optical structure 22 which is an example of such a structure which has a varying profile. In the plane of the waveguide optical structure 22 has the notched diamond shape of optical structure 20. However, the profile of optical structure 22 varies. This variation in profile is in a direction across the plane of the waveguide. Thus, optical structure 22 has a gradient, or slope between one end of the optical structure 22 to the opposite end. As can be seen the profile of optical structure 22 varies continuously from one side of the optical structure 22 to the other. When viewed from the perspective in FIG. 3B this is at an angle with respect to the vertical direction. The slope extends from the longest side 101 of the notched parallelogram to longest side 103 at this angle to the vertical, i.e. across a diagonal of the optical element. This is along the y and x-axis when viewed in the plane of the waveguide.

FIG. 3C shows optical structure 24 which is a further example of an optical structure that can selectively suppress the transmitted or reflected orders. As can be seen, optical structure 24 has a varying profile. Discontinuity 28 separates two regions 30a 30b of the profile of the optical structure 24. First region 30a is higher than second region 30b creating the variation in profile. This creates a step at the discontinuity 28 between the two regions. The step, and therefore the discontinuity, extends across the entire extent of the optical structure, from one side to the opposite side. The step (and discontinuity) extends across the optical structure at an angle to the vertical direction, as viewed in FIG. 3C. This angle is perpendicular to the angle through which the variation in profile occurs. The variation in profile is from side 101 to side 103 of optical structure 24. In other words, the discontinuity is positioned at an angle that is parallel to the sides 103 101 of the notched parallelogram. The discontinuity 28 is positioned at the centre of the optical structure 24 along the angle described above. The physical extent of the optical structure perpendicular to the plane of the waveguide may be considered as its height. The height of the step is half of the height of the optical structure. It can also be seen that a further step 29 can be considered to be present between the edge 103 of the optical structure and the surrounding region of the output grating 4.

FIG. 3D shows optical structure 26 which is a further example of an optical structure that can selectively suppress the transmitted or reflected orders. As can be seen, optical structure 26 has a varying profile. Optical structure 26 has four discontinuities 32a-d each between five different flat regions 34a-e of the optical structure 26. Each of the discontinuities 32a-d are vertical sections which separate two adjacent flat regions 30a-e of the profile of the optical structure 26. Each of the discontinuities are equally spaced across the optical structure between side 101 and side 103. The height of the regions 30a-e decreases across the optical structure creating the variation in profile. This creates five steps, if the edge of the optical structure 33 and the surrounding region of the output grating 4 is taken as a further step. Each of the discontinuities 32a-e (and therefore the steps) are arranged at an angle as described above in relation to FIG. 3C, and each extend across the extent of the optical structure. As shown in FIG. 3D each of the steps have the same height. This is 20% of the height of the highest point of optical structure 26. However, in other arrangements the height of each of the steps may vary with respect to each other.

Advantageously by having steps, as in optical structure 24 and optical structure 26, the optical structures are easier to manufacture than optical structure 22 whilst still providing the effect of suppressing either the transmitted or reflected orders.

FIG. 3E shows optical structure 25 which is further example of such a structure which has a varying profile. In the plane of the waveguide optical structure 25 has the notched diamond shape of optical structure 20. However, the profile of optical structure 25 varies. This variation in profile is in a direction across the plane of the waveguide. Thus, optical structure 25 has a gradient, or slope between one end of the optical structure 25 to the opposite end. As can be seen the profile of optical structure 25 varies continuously from one side of the optical structure 25 to the other. When viewed from the perspective in FIG. 3E this gradient is between vertex 107 and vertex 105 of the optical structure. Vertex 105 and vertex 107 are the vertices which are between the two largest sides of the notched parallelogram cross section. Unlike the optical structure in FIG. 3B the profile of optical structure 25 shown in FIG. 3E varies along the vertical axis when viewed in FIG. 3E, i.e. along the y-axis when viewed in the plane of the waveguide, rather than at an angle to said axis.

FIG. 3F shows optical structure 27 which is a further example of an optical structure that can selectively suppress the transmitted or reflected orders. Optical structure 27 shown in FIG. 3F may be considered a combination of optical structures 42 and optical structure 44 shown in FIG. 4. As with the optical structure in FIG. 3E, the profile of optical structure 27 shown in FIG. 3F varies along the vertical axis, rather than at an angle to said axis. However, two discontinuities 38a and 38b separate two regions 39a 39b of the profile of the optical structure 27. First region 39a is higher than second region 39b creating the variation in profile. This creates a step at the discontinuities 38a 38b between the two regions. Region 39b has a diamond cross sectional shape having four sides, whereas region 39a has a cross-sectional shape having 10 sides. The discontinuities 38a 38b are at right angles to each other in the cross sectional plane and each extend from different sides of the optical structure 27 to meet at the centre point 41 of the optical structure 27. The physical extent of the optical structure 27 perpendicular to the plane of the waveguide may be considered as its height. The height of the step 38 is half of the height of the optical structure. The optical structure 27 may be considered a modified stepped version of the optical structure 25 shown in FIG. 3E.

Each of the optical structures shown in FIG. 3B to 3F may be used in an output grating 4 as shown in FIG. 1B but providing preferential outcoupling in either transmission or reflection, such that it is predominantly from either the first major surface 5 or second major surface 7 of the waveguide.

Figure 4:
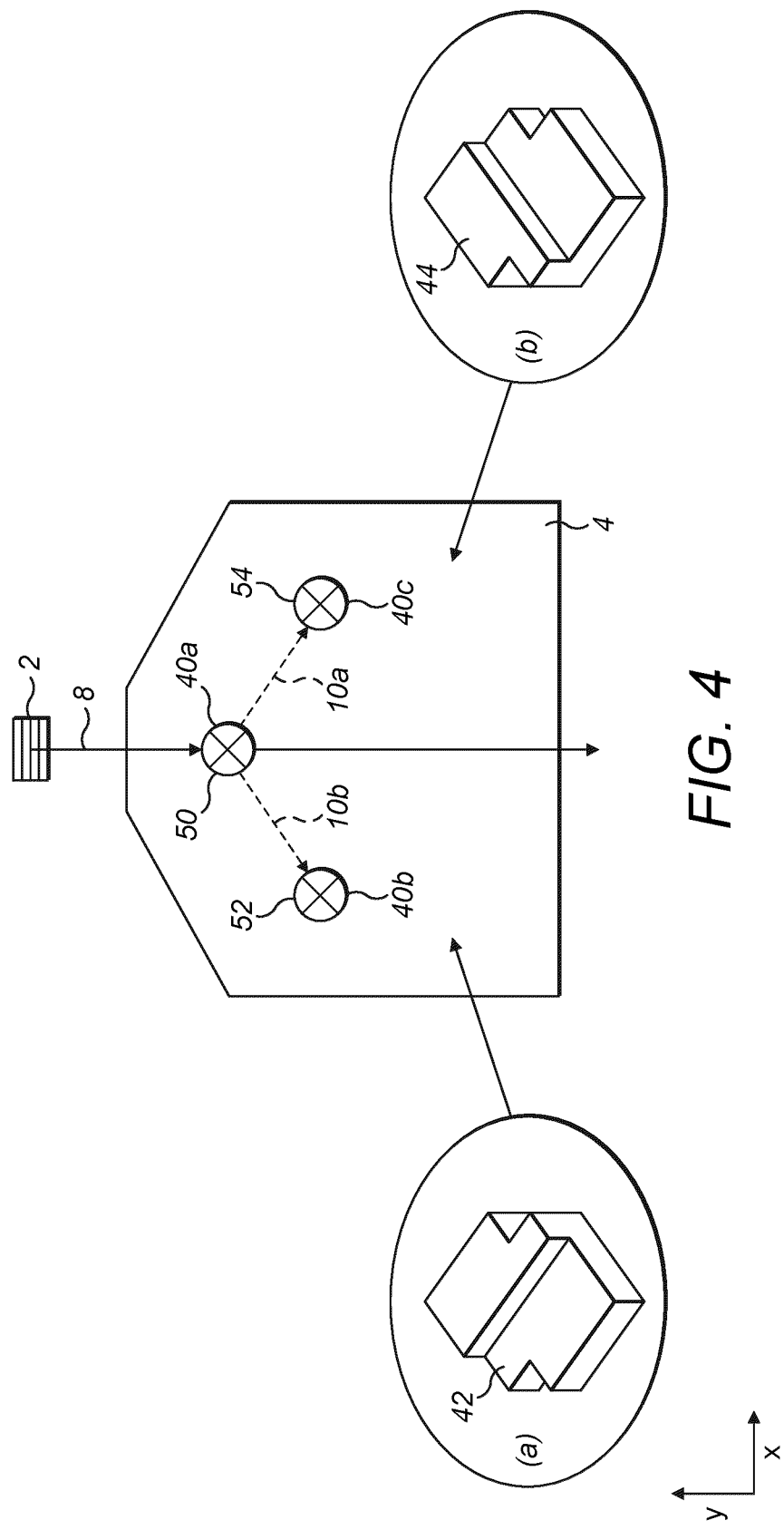
FIG. 4 shows an example output grating according to the present invention that is configured to ensure that the reflected orders are out-coupled from the waveguide with higher efficiency than the transmitted out-coupled orders.

FIG. 4 shows an example output grating 4 that is configured to ensure that reflected orders are preferentially out-coupled out of the waveguide (in comparison to transmitted orders). Light from input grating 2 is incident on output grating 4 along input light path 8. The input light initially diffracts from the grating formed by the array of optical structures at position 40a. This is as described in relation to FIG. 1. At this position 40a the optical structures have a profile as shown in FIG. 3E, or an optical structure that has one or more steps such as shown in FIG. 3F. This results in turn orders 10a 10b as described in relation to FIG. 1. However, the out-coupling orders generated upon interaction of the input light with the array of optical structures at position 40a is preferentially the reflected order 50, with the transmitted order suppressed.

The light from turn order 10b is incident on the grating provided by the array of optical structures at position 40b. The profile of the optical structures 42 at this position 40b is shown in inset (a) of FIG. 4. Optical structure 42 has a stepped profile that is similar to optical structure 24 shown in FIG. 3C. However, optical structure 42 has a profile that varies in the same direction as turn order 10b. This is at an angle −60° to the input direction. At position 40b the light from turn order 10b is incident towards the side of the optical structures 42 which extend furthest in the plane perpendicular to the waveguide (i.e. in the z-axis using the notation shown in FIG. 4), i.e. the highest side or side which has the largest physical extent perpendicular to the plane of the waveguide. With the array of optical structures 42 at this position 40b having this profile the out-coupled orders from the optical structures 42 at position 40b are preferentially the reflected orders 52, with the transmitted orders suppressed.

The light from turn order 10a is incident on the grating provided by the array of optical structures at positon 40c. The profile of the optical structures 44 at this position is shown in inset (b) of FIG. 4. Optical structure 44 has a stepped profile that is similar to optical structure 24 shown in FIG. 3C. However, optical structure 44 has a profile that varies in the same direction as the direction of turn order 10a. This is at an angle +60° to the input direction. At position 40c the light from turn order 10a is incident towards the side of the optical structures 44 which extend furthest in the plane perpendicular to the waveguide, i.e. the highest side or side which has the largest physical extent perpendicular to the plane of the waveguide. With the array of optical structures 44 at this position 40c having this profile the out-coupled orders from the optical structures 44 at position 40c are preferentially the reflected orders 54, with the transmitted orders suppressed.

The plane of the waveguide is defined by the x-y plane as shown in FIGS. 1A and 4. When viewed in the plane of the waveguide as shown in FIG. 4, all of the optical structures that are arranged on the left side of the output grating with respect to the input direction are optical structures as shown in inset (a). This is all of the optical structures in the −x direction with respect to the input direction.

In addition, all of the optical structures that are arranged on the right side of the output grating with respect to the input direction are optical structures as shown in inset (b). This is all of the optical structures in the +x direction with respect to the input direction.

Any optical structure lying on the input direction has the profile as described in relation to optical structure shown in FIG. 3E or FIG. 3F.

Figure 5:
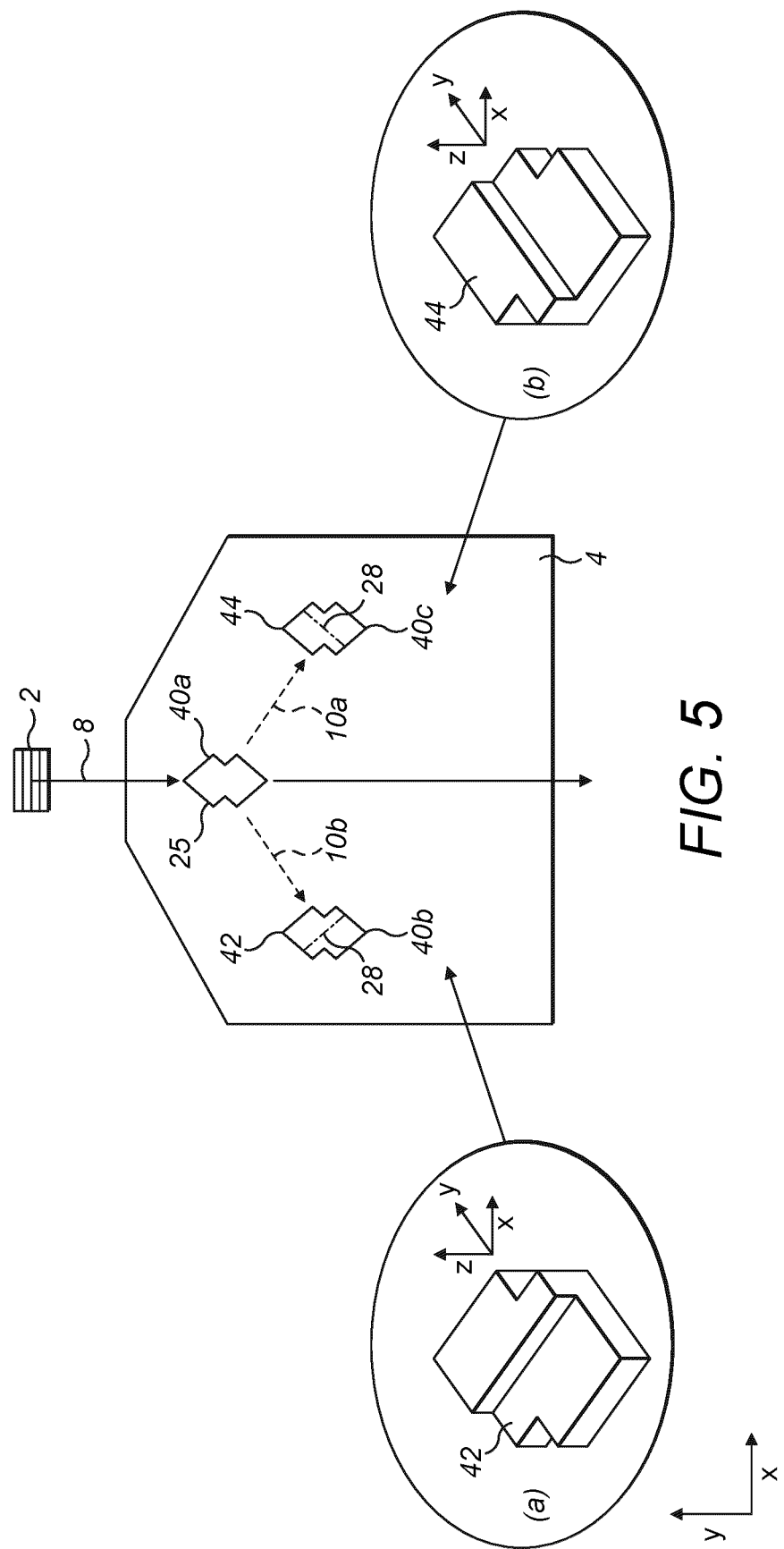
FIG. 5 shows the example output grating of FIG. 4 according to the present invention that is configured to ensure that the reflected orders are out-coupled from the waveguide with higher efficiency than the transmitted out-coupled orders showing the shape of the optical structures when viewed in the plane of the waveguide.

Although FIG. 4 shows the shape of the optical structures in the insets (a) and (b), showing the variation in profile, the actual shape of the optical structures in the plane of the waveguide are not shown on the output grating 4 in FIG. 4. For the sake of clarity, the shape of the optical structures in the plane of the waveguide are shown in FIG. 5. As can be seen from FIG. 5 each of the optical structures 42, 44 25 have the notched diamond shape when viewed top down in the x-y plane. Although only a single optical structure in each position, 40a 40b 40c, is shown in FIG. 5 in reality there would be an array of optical structures offset from each other in each position, each having the same shape in that position of the waveguide. Discontinuity 28, indicating the position of the step, can also be clearly seen on optical structures 42 and 44 the orientation of which is as discussed above in relation to FIG. 4.

In an alternative arrangement, where only transmission orders are desired the profile of each of the optical structures may vary in the opposite direction to that shown in FIG. 4. For instance, optical structure 40b and 40c may increase in height, or physical extent, in the direction perpendicular to the plane, from the point at which the light is incident towards the optical structure. This may also be true for the optical structures lying along the input direction.

It has been found that for an output grating where the profile of each of the optical structures is uniform the average reflected luminance as 203 nits/L, and the average transmitted luminance as 141 nits/L. This provides a ratio of reflected to transmitted luminance of 1.45. This is having an optical structure 20 shown in FIG. 3A throughout the output grating.

It has been found that for an output grating where the profile of each of the optical structures varies as shown in FIG. 4 the average reflected luminance is 330 nits/L and the average transmitted luminance as 110 nits/L. This provides a ratio of reflected to transmitted luminance of 3.00.

These results show that the use of optical structures with varying profiles in the output grating can be used to preferentially diffract light in the direction towards the viewer, reducing the unwanted diffraction in the opposite direction. It can be seen that the use of these structures, which can be referred to as pseudo-blazed structures, increase the luminance at the eye by 60%.

It would be understood, as described above, that by orientating the variation in profile in the opposite way the transmitted orders can be preferentially selected rather than the transmitted orders.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The optical structures described above may be 3D nanostructures elements, or pillars, the variation in the profile may be considered to be a variation in the height of the nanostructure or its physical extent perpendicular to the plane of the waveguide. Thus, the height, or physical extent, of the nanostructure, perpendicular to the plane of the waveguide, may vary. In other arrangements, the optical structures may be provided by layers in the waveguide which have an operational surface of refractive index. The profile of these surfaces, i.e. the position in the direction perpendicular to the plane of the waveguide, may vary in the way as described above.

In the embodiments shown above the optical structures arranged along the input direction 8 are described as having a profile which varies in a direction that is the same as the input direction. However, in other arrangements the profile of such structures may be uniform, i.e. no blaze, such as optical structure 20 as show in FIG. 3A. In other arrangements, only the first optical structure along the input direction may have this profile.

In other arrangements, the optical structures along the input direction may have a profile of the optical structures shown in inset (a) and/or (b) as shown in FIG. 4.

This is because the width of this very central line may be small, such as approximately 0.5 μm wide. Thus, the profile of the optical structures along this central line may have minimal impact on the directionality of the image as a whole.

In the examples shown in FIGS. 3C, 3D and 3F the optical structures may have a profile that is stepped. The number of steps are not limited to the examples shown in these figures. For instance, the number of steps may be 1, 2, 3, 4, 5 or more steps.

The invention claimed is:

1. A planar slab waveguide for use in an augmented reality or virtual reality display, comprising:
an input diffractive optical element;
an output diffractive element comprising a plurality of optical structures in a photonic crystal, wherein the optical structures have a different refractive index to a surrounding waveguide medium, wherein the input diffractive optical element couples light towards the plurality of optical structures along an input light path;
a first major surface of the planar slab waveguide, and a second major surface of the planar slab waveguide, the second major surface parallel to the first major surface, wherein light propagates through the planar slab waveguide along the input light path towards the output diffractive element by undergoing total internal reflection between the first and second major surfaces;
wherein the plurality of optical structures are arranged in a plane of the planar slab waveguide parallel to the first major surface and the second major surface in an array which is configured to:
receive light from the input light path;
diffract a first portion of the light into an angle relative to the input light path to provide 2D expansion across the plane of the planar slab waveguide; and
diffract a second portion of the light out of the plane of the planar slab waveguide,
wherein at least one of the optical structures of the plurality of optical structures has a height in a direction that is perpendicular to the plane of the planar slab waveguide, wherein the height varies along one or more directions parallel to the plane of the planar slab waveguide, thereby causing the second portion of light to be diffracted preferentially from the first major surface of the planar slab waveguide, compared to the second major surface of the planar slab waveguide.

2. The planar slab waveguide of claim 1, wherein the height of the at least one of the optical structures of the plurality of optical structures varies continuously along the one or more directions parallel to the plane of the planar slab waveguide.

3. The planar slab waveguide of claim 1, wherein the at least one of the plurality of optical structures has a discontinuity in its height.

4. The planar slab waveguide of claim 3, wherein the at least one of the plurality of optical structures comprises a plurality of discontinuities.

5. The planar slab waveguide according to claim 1, wherein a variation in height of at least some of the plurality of optical structures is different to the variation in height of others of the plurality of optical structures.

6. The planar slab waveguide according to claim 5, wherein a first subset of optical structures from the plurality of optical structures in a first region of the planar slab waveguide comprise a first variation in height of optical structures and a second subset of optical structures from the plurality of optical structures in a second region of the planar slab waveguide comprise a second variation in height of optical structures different from the first variation in height, and the first region being displaced from the second region along the plane of the planar slab waveguide.

7. The planar slab waveguide according to claim 5, wherein the input light path defines a first axis in the plane of the planar slab waveguide, and the one or more directions through which the optical structures vary in height is at an angle to the input light path.

8. The planar slab waveguide according to claim 7, wherein a first subset of optical structures from the plurality of optical structures in a first region of the planar slab waveguide comprise a first variation in height of optical structures and a second subset of optical structures from the plurality of optical structures in a second region of the planar slab waveguide comprise a second variation in height of optical structures, wherein the direction through which the first subset of optical structures vary in height is at a first angle to the input light path and the direction through which the second subset of optical structures vary in height is at a second angle to the input light path, wherein the first region and the second region are separated by a line formed along the input light path extending from a point at which light is incident at the output diffractive element.

9. The planar slab waveguide according to claim 1, wherein at least one of the plurality of optical structures is arranged such that the height of the at least one optical structure has a negative gradient in a direction away from a point at which the light is incident on the at least one optical structure.

10. The planar slab waveguide according to claim 1, wherein at least one of the plurality of optical structures is arranged such that the height of the at least one optical structure has a positive gradient in a direction away from a point at which the light is incident on the at least one optical structure.

11. The planar slab waveguide of claim 1, wherein the plurality of optical structures, respectively, have a shape, when viewed in the plane of the planar slab waveguide, comprising a plurality of substantially straight sides having respective normal vectors at different angles.

12. An augmented reality or virtual reality display, comprising:
a planar slab waveguide comprising:
an input diffractive optical element to couple light into the planar slab waveguide; and
an output diffractive element including a plurality of optical structures in a photonic crystal, wherein the optical structures have a different refractive index to a surrounding waveguide medium, wherein the input diffractive optical element couples light towards the plurality of optical structures along an input light path;
a first major surface of the planar slab waveguide, and a second major surface of the planar slab waveguide, the second major surface parallel to the first major surface, wherein light propagates through the planar slab waveguide along the input light path towards the output diffractive element by undergoing total internal reflection between the first and second major surfaces;
wherein the plurality of optical structures are arranged in a plane of the planar slab waveguide parallel to the first major surface and the second major surface in an array which is configured to:
receive light from the input light path;
diffract a first portion of the light into an angle relative to the input light path to provide 2D expansion across the plane of the planar slab waveguide, and
diffract a second portion of the light out of the plane of the planar slab waveguide;
wherein at least one of the optical structures of the plurality of optical structures has a height in a direction that is perpendicular to the plane of the planar slab waveguide, wherein the height varies along one or more directions parallel to the plane of the planar slab waveguide, thereby causing the second portion of light to be diffracted preferentially from the first major surface of the planar slab waveguide, compared to the second major surface of the planar slab waveguide.

13. The augmented reality or virtual reality display of claim 12, wherein the height of the at least one of the optical structures of the plurality of optical structures varies continuously along the one or more directions parallel to the plane of the planar slab waveguide.

14. The augmented reality or virtual reality display of claim 12, wherein the at least one of the plurality of optical structures has a discontinuity in its height.

15. The augmented reality or virtual reality display of claim 14, wherein the at least one of the plurality of optical structures comprises a plurality of discontinuities.

16. The augmented reality or virtual reality display according to claim 15, wherein the input light path defines a first axis in the plane of the planar slab waveguide, and the one or more directions through which the optical structures vary in height is at an angle to the input light path.

17. The augmented reality or virtual reality display according to claim 16, wherein a first subset of optical structures from the plurality of optical structures in a first region of the planar slab waveguide comprise a first variation in height of optical structures and a second subset of optical structures from the plurality of optical structures in a second region of the planar slab waveguide comprise a second variation in height of optical structures, wherein the direction through which the first subset of optical structures vary in height is at a first angle to the input light path and the direction through which the second subset of optical structures vary in height is at a second angle to the input light path, wherein the first region and the second region are separated by a line formed along the input light path extending from a point at which light is incident at the output diffractive element.

18. The augmented reality or virtual reality display of claim 12, wherein a variation in height of at least some of the plurality of optical structures is different to the variation in height of others of the plurality of optical structures.

19. The augmented reality or virtual reality display according to claim 18, wherein a first subset of optical structures from the plurality of optical structures in a first region of the planar slab waveguide comprise a first variation in height of optical structures and a second subset of optical structures from the plurality of optical structures in a second region of the planar slab waveguide comprise a second variation in height of optical structures different from the first variation in height, and the first region being displaced from the second region along the plane of the planar slab waveguide.

20. A method of manufacture of a planar slab waveguide for an augmented reality or virtual reality display, the method comprising:
providing a planar slab waveguide comprising an input diffractive optical element and an output diffractive element comprising a plurality of optical structures in a photonic crystal, wherein the optical structures have a different refractive index to a surrounding waveguide medium, wherein the input diffractive optical element couples light towards the plurality of optical structures along an input light path;

arranging the plurality of optical structures, wherein the planar slab waveguide comprises a first major surface of the waveguide, and a second major surface of the waveguide, the second major surface parallel to the first major surface, wherein light propagates through the planar slab waveguide along the input light path towards the output diffractive element by undergoing total internal reflection between the first and second major surfaces;

wherein the plurality of optical structures are arranged in a plane of the planar slab waveguide parallel to the first major surface and the second major surface in an array which is configured to:

receive light from the input light path;

diffract a first portion of the light into an angle relative to the input light path to provide 2D expansion across the plane of the planar slab waveguide; and diffract a second portion of the light out of the plane of the planar slab waveguide, wherein at least one of the optical structures of the plurality of optical structures has a height in a direction that is perpendicular to the plane of the planar slab waveguide, wherein the height varies along one or more directions parallel to the plane of the planar slab waveguide, thereby causing the second portion of the light to be diffracted preferentially from the first major surface of the planar slab waveguide, compared to the second major surface of the planar slab waveguide.

* * * * *